United States Patent [19]
Mazhar

[11] Patent Number: 5,395,082
[45] Date of Patent: Mar. 7, 1995

[54] HANGAR FOR VEHICLE ACCESSORIES

[75] Inventor: Mohammad S. Mazhar, Sterling Heights, Mich.

[73] Assignee: The United States of America as represented by the Secretary of the Army, Washington, D.C.

[21] Appl. No.: 147,277

[22] Filed: Nov. 2, 1993

[51] Int. Cl.⁶ ............................................. E04G 3/00
[52] U.S. Cl. ................................... 248/274; 248/286
[58] Field of Search ............ 248/238, 286, 274, 311.2, 248/642; 404/93

[56] References Cited

U.S. PATENT DOCUMENTS 3,212,817  10/1965  Sully ................................. 248/274
5,286,045   2/1994  Cyphers et al. ................. 280/47.18

Primary Examiner—Leslie A. Braun
Assistant Examiner—Catherine S. Collins
Attorney, Agent, or Firm—Peter A. Taucher; David L. Kuhn

[57] ABSTRACT

Disclosed is a device to mount an accessory to a vehicle wherein the accessory can be moved between a deployed position or a retracted position. The device has a mounting bracket removably fixed to the vehicle and has cylinders fixed to the mounting bracket. The device also has shafts translatably received in the cylinders, an accessory bracket fixed to the shafts, and a shield bracket on one of the shafts between the mounting bracket and the accessory bracket. The device has a lane marker dispenser or other accessory pivoted on the accessory bracket about the same axis as a shield pivots on the shield bracket. The shield and its bracket are translatable toward or away from the accessory bracket on this axis. The device additionally has structure for locking the shield to the accessory after the shield is translated toward the accessory.

12 Claims, 5 Drawing Sheets

5,395,082

HANGAR FOR VEHICLE ACCESSORIES

GOVERNMENT USE

The invention described herein may be manufactured, used and licensed by or for the U.S. Government for governmental purposes without payment to me of any royalty thereon.

BACKGROUND AND SUMMARY

Main battle tanks and like vehicles are often assigned tasks other than combat when performing their missions. Such tasks include retrieval of inoperative vehicles from a combat area or clearing a mine field or a portion thereof to allow safe passage of an advancing force. Accompanying the mine clearing function is the function of marking the lane or passageway that has been cleared, the latter function accomplished by a dispenser on the tank which automatically deploys lane markers at the outer boundaries of the cleared passageway. Since the lane to be marked is wider than the tank, it is desired to position lane marking dispensers outboard of the tank at either side thereof during the lane marking process. However, when the tank is not marking lanes, it is desired to retract the dispenser inboard of the tank so that the dispenser is less susceptible to damage during cross-terrain travel of the tank. Optimally, the dispenser will be retracted to a position directly ahead of or behind the tank, whereby the tank can travel in reverse or forward gear, with the dispenser trailing the hull and protected thereby.

My invention achieves the foregoing goals by mounting a lane marker dispenser or other accessory to a vehicle such that the accessory deploys outboard and retracts inboard at the front or rear of the vehicle. The invention has cylinders fixed to the vehicle, shafts translatable in the cylinders, an accessory bracket fixed to the shafts, a shield to protect the accessory and a shield bracket fixed to one of the shafts. The accessory pivots on the accessory bracket on the same axis as the shield pivots on the shield bracket. The shield and its bracket can translate toward or away from the accessory bracket on this axis so that the shield covers or uncovers the accessory. My invention also has structure to lock the shield to the accessory when their respective brackets are close together.

DETAILED DESCRIPTION

Figure 3:
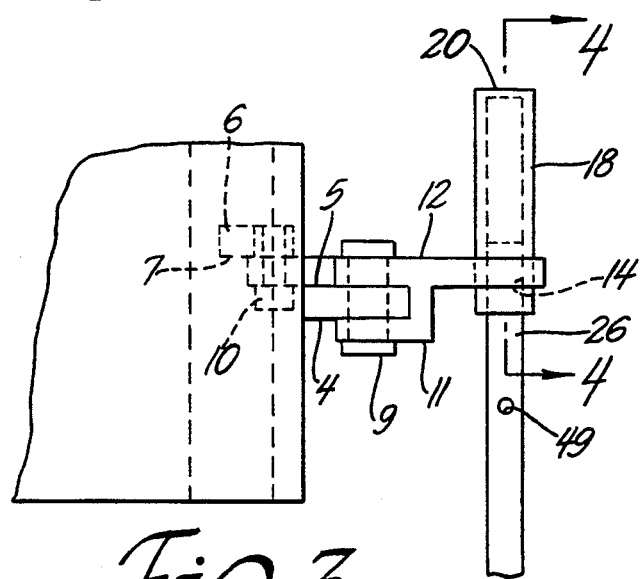
FIG. 3 is a detail view of a mounting bracket and adjoining structure shown in FIG. 1.
Figure 4:
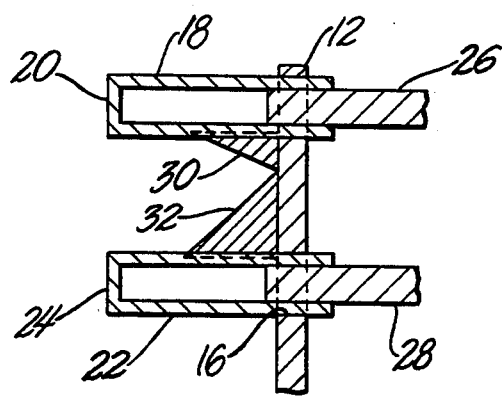
FIG. 4 is a view taken along line 4—4 in FIG. 3.
Figure 5:
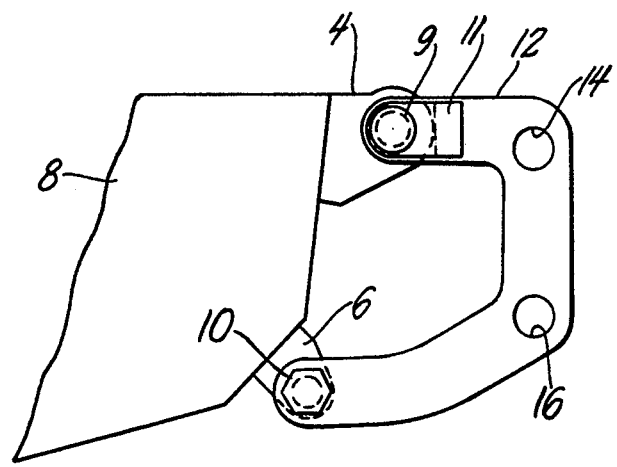
FIG. 5 is side elevational view of the mounting bracket on the hull.

Shown in FIG. 5 is the forward section of a conventional body or hull 8 of a tank or other vehicle to which are fixed flat lugs 4 and 6. Fixed on the lugs by such means as a pin 9 or bolt 10 pin is a flat, horizontally oriented, crescent-shaped bracket 12 having apertures 14 and 16. These apertures are coplanar in that they both have a flat shape and both lie in the general plane defined by bracket 12. Lug 4 is sandwiched between the main body of bracket 12 and extension 11 thereof, whereas lug 6 is on the inboard side (upper side in FIGS. 1 and 3) of the bracket. As best shown in FIG. 3, cylinder 18 is securely fixed normal to bracket 12 through aperture 14, the cylinder closed at end 20. As seen in FIG. 4, a second cylinder 22, closed at end 24, is mounted to bracket 12 through aperture 16 (FIG. 5) parallel to cylinder 18. Cylinders 18 and 22 are similarly constructed, are horizontal, and are disposed one directly above the other. These cylinders have a majority of their lengths protruding from bracket 12 inboard and away from a subassembly comprised of bracket 34, bracket 36, dispenser 40 and shield 38. Round shafts 26 and 28 are closely received and translatable in the cylinders, and outside the cylinders are gussets 30 and 32 welded or otherwise fixed both to bracket 12 and a respective one of the cylinders. Cylinders 18 and 22 may optionally be replaced by tubes having polygonal cross sections accepting deployment shafts whose complimentary polygonal cross sections fit closely with the polygonal tubes. For some applications it may be desired that a single polygonal tube and shaft replace both cylinders and both round shafts.

Figure 1:
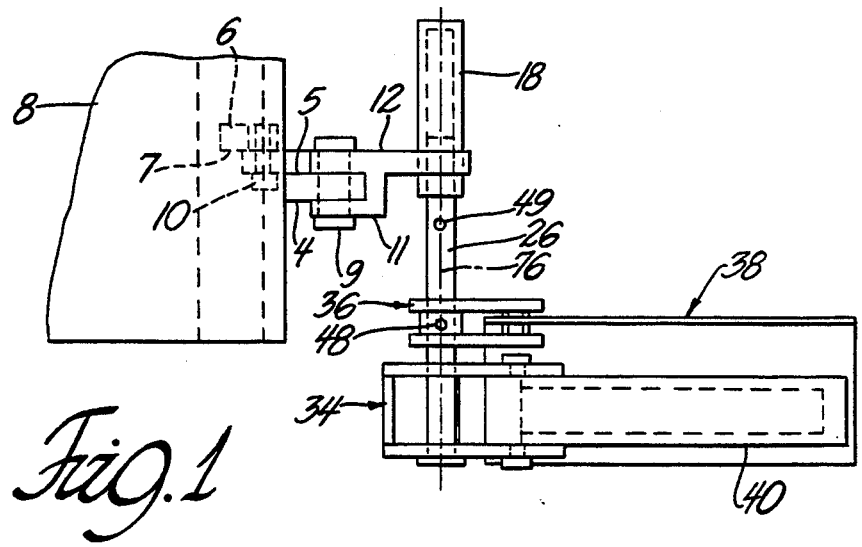
FIG. 1 is a plan view of a lane marker dispenser and its shield mounted to the right front portion of a vehicle hull.

At the opposite ends of shafts 26 and 28 from the cylinders in FIG. 1 is a subassembly comprised of a primary accessory bracket 34, a secondary accessory bracket 36, shield 38 and dispenser 40. The subassembly is fixed relative to the shafts so as to translate outboard or inboard with them relative to hull 8. The weight of the subassembly creates a torque on bracket 12 which causes the main body of bracket 12 to frictionally bear against the inboard face 5 of lug 4 and to frictionally bear against the outboard face 7 of lug 6. A detail view of the subassembly at FIG. 6 shows engagements of brackets 34 and 36 with the shafts, shield 38 and dispenser 40.

Figure 6:
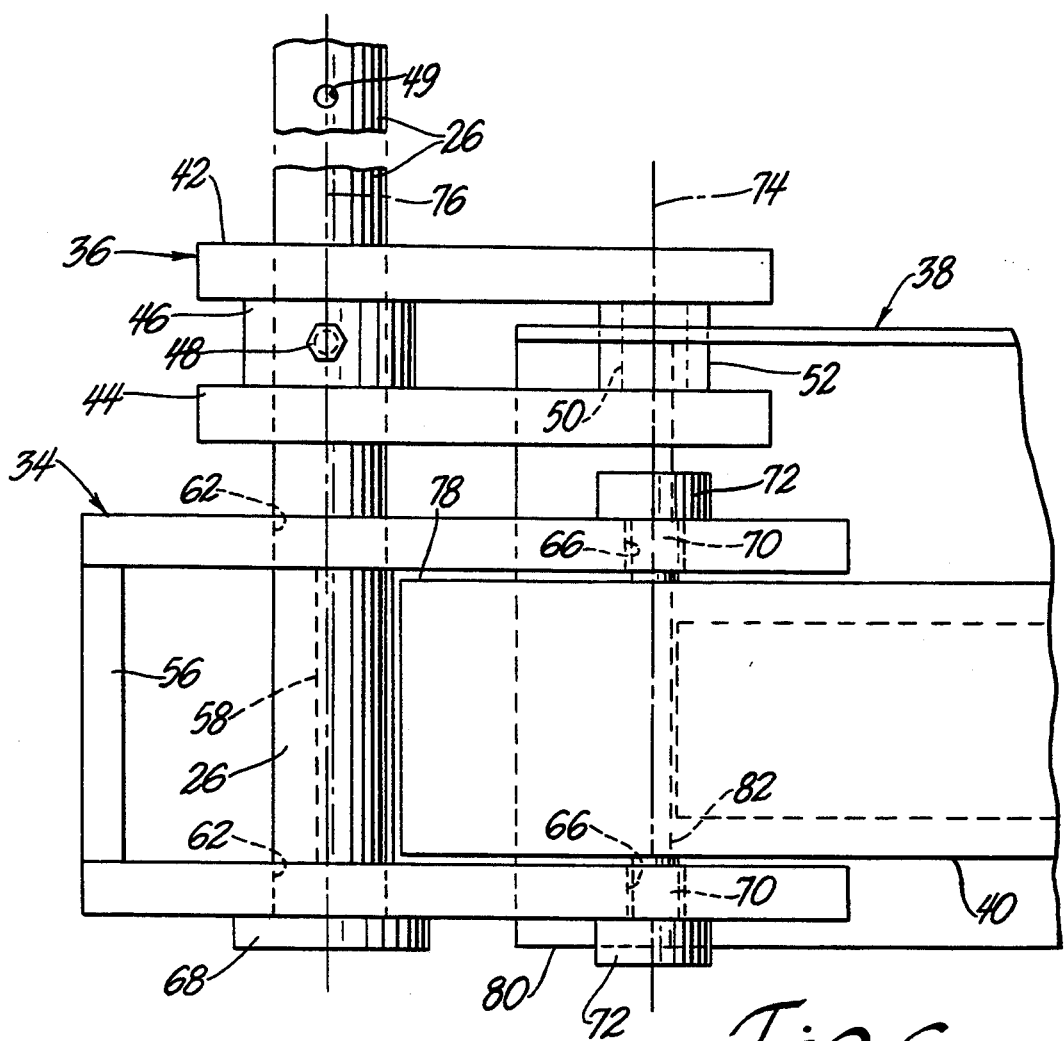
FIG. 6 is a detail view showing connections among deployment shafts, brackets, the dispenser and the dispenser's shield.

Referring now to FIG. 6, a secondary accessory bracket or shield bracket 36 comprises a pair of oval plates 42 and 44 through which shaft 26 closely fits. The plates are parallel, extend forward from shaft 26 and define a narrow gap between themselves. Fixing the plates together is a short sleeve 46 centered on axis 76 and closely surrounding shaft 26, there being a bolt 48 passing through the sleeve and shaft to fix the position of bracket 36 upon the shaft. Once bolt 48 is removed, bracket 36 can be slid inboard on shaft 26 away from bracket 34 until bracket 36 is aligned with hole 49 in the shaft, whereupon bolt 48 can be reinserted through bracket 36 and passed through hole 49 so as to lock bracket 36 in an inboard position. At the opposite ends of the plates from shaft 26 and fixed therebetween is a stub shank 50 (FIG. 6) on which is closely fit sleeve 52 integral with shield 38. It is preferred that the ends of sleeve 52 be in facial contact with the inner, opposing faces of plates 42 and 44 as shown in FIG. 6.

Figure 8:
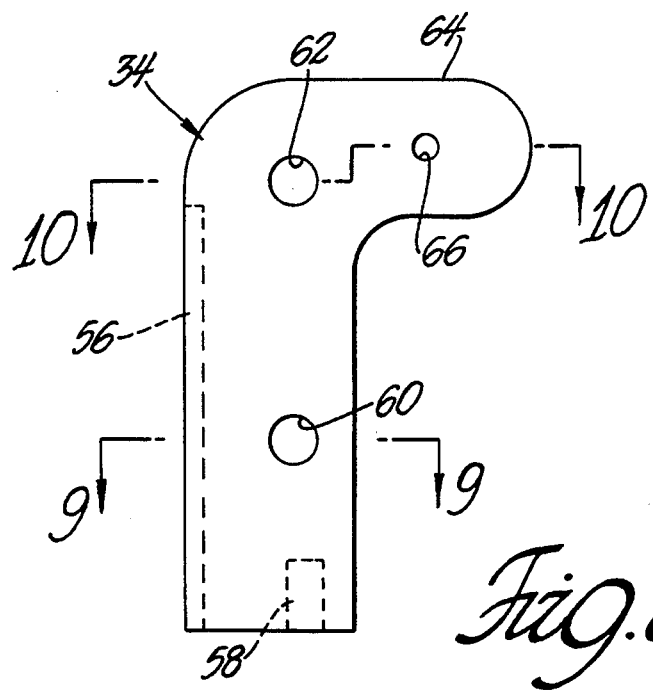
FIG. 8 is a side elevational view of the accessory bracket, which mounts the dispenser.
Figure 9:
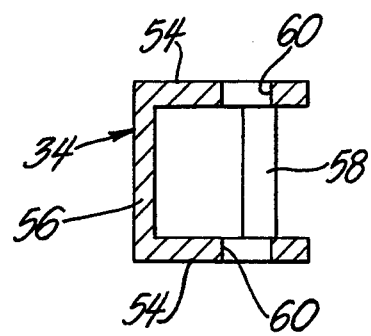
FIG. 9 is a view taken along line 9—9 in FIG. 8.
Figure 10:
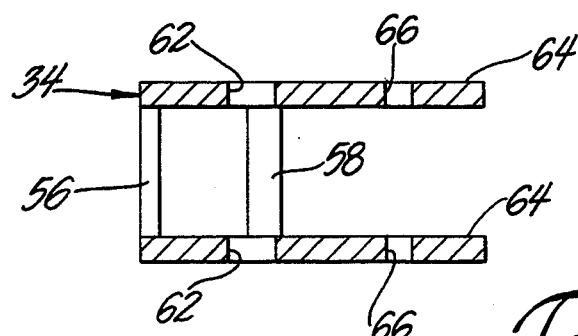
FIG. 10 is a view taken along line 10—10 in FIG. 8.

Although bracket 34 is shown in FIG. 6, the structure of that bracket is perhaps best explained in conjunction with FIGS. 8, 9 and 10, which are views of bracket 34 alone. The lower part of bracket 34 is a U-shaped upright channel comprised of two opposed parallel walls 54 and web 56 therebetween. At the bottom end of the upright channel is cross-sectionally rectangular stop bar 58 fixed between walls 54. Lower aligned apertures 60 in walls 54 closely receive shaft 28 (FIGS. 2 and 4) and upper aligned apertures 62 in these walls closely receive shaft 26. Typically bracket 34 is welded to the shafts or fixed to the shafts by other suitable, known means. At the upper ends of walls 54 are forwardly extending ears 64, which are integral with the walls and which define axially aligned holes 66.

Figure 2:
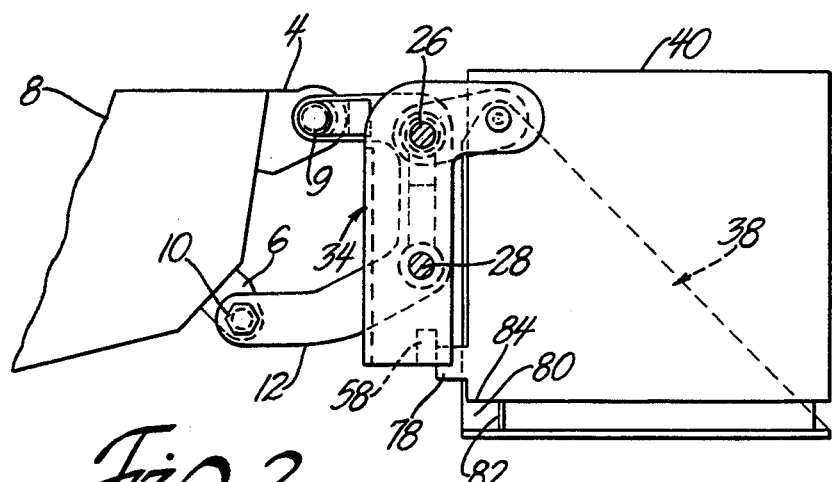
FIG. 2 is a side elevational view of the dispenser and shield mounted to the right front portion of the vehicle hull.
Figure 11:
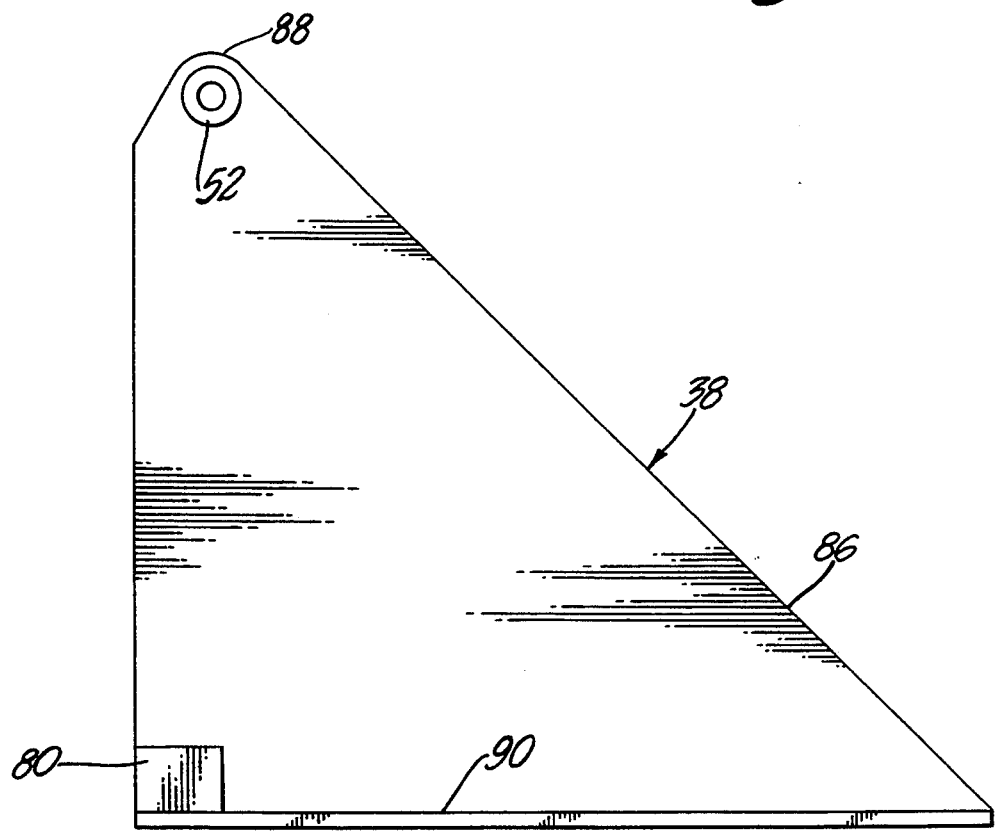
FIG. 11 is a side elevational view of the shield.
Figure 12:
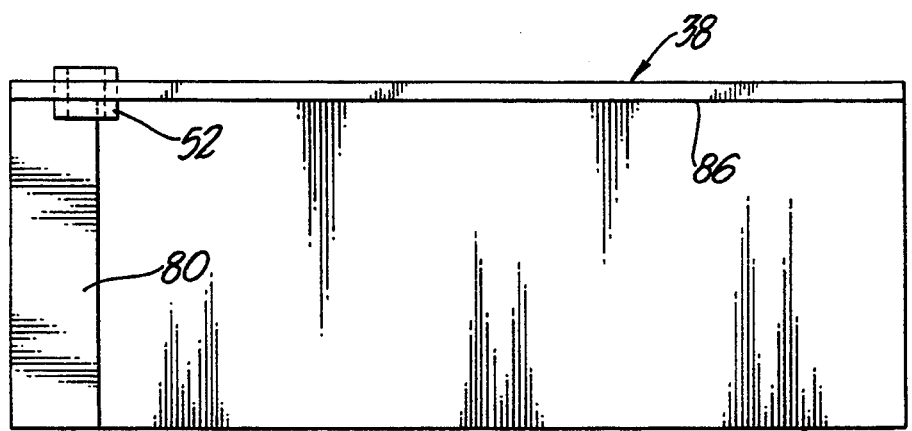
FIG. 12 is a plan view of the shield.

Like bracket 34, shield 38 is seen in FIG. 6, but the configuration of shield 38 is most clearly shown in FIGS. 11 and 12, where a vertical, generally triangular panel or wall 86 has sleeve 52 at the wall's rounded apex 88. Fixed along the bottom edge of wall 86 is a rectangular plate 90, which normally covers the bottom of dispenser 40 as seen in FIG. 2. Elongate beam or rectangular bar 80 is welded or otherwise permanently fixed to both wall 86 and plate 90.

Referring again to FIG. 6, bracket 34 can be held on shafts 26 and 28 by heads affixed to ends of the shafts, such a head being shown at 68. In such a case bracket 34 need not be welded to the shafts, and inboard motion of bracket 34 along the shafts can be limited by bracket 36. Dispenser 40 is journalled in bracket 34 by short spindles 70 fixed to dispenser 40 and protruding through holes 66, spindles 70 having heads 72 to retain dispenser 40 on bracket 34. Bracket 34 and dispenser 40 are also engaged at the dispenser's rectangular protrusion 78 (FIG. 2), which abuts stop bar 58 of that bracket, whereby dispenser 40 is prevented from swinging backward toward hull 8. In a somewhat similar fashion, shield 38 has an elongate rectangular bar 80 that abuts or faces against dispenser 40 at interfaces 82 and 84 (FIG. 2). Since spindles 70, holes 66, stub shank 50 of bracket 36 and sleeve 52 of shield 38 are all centered on common axis 74, shield 38 and dispenser 40 can swing together as a unit. The engagement between bar 80 and dispenser 40 locks the shield and dispenser together as they swing about axis 74, and shield 38 can be disengaged from dispenser 40 only by moving shield 38 along axis 74 away from dispenser 40.

Figure 7:
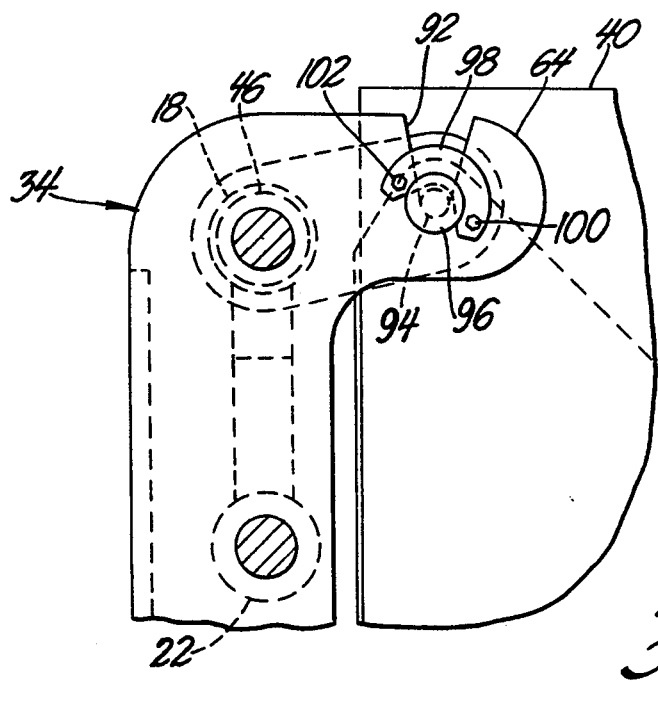
FIGS. 7 and 7A show an alternate pivotal connection between the dispenser and its bracket.
Figure 7A:
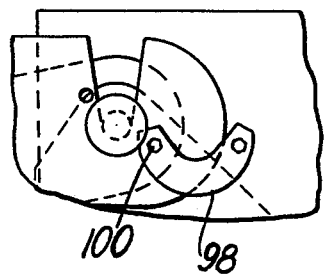

FIG. 7 shows an optional modification to bracket 34 wherein ear 64 has V-shaped notch 92 which receives spindle 94 that connects dispenser 40 to the spindle's head 96. A releasable arcuate keeper 98 is pivotable about pin 100 on ear 64 and is received on spindle 94. Keeper 98 can be locked in its FIG. 7 position by a conventional fastener such as bolt 102, whereby dispenser 40 is swingably held in bracket 34. The side of bracket 34 facing away from the viewer in FIG. 7 also has a notch 92 receiving a spindle 94 and a keeper 98 engaging the spindle. FIG. 7A shows keeper 98 swung away from spindle 34 so that the spindle, and hence dispenser 40, can be removed from bracket 34.

Figure 13:
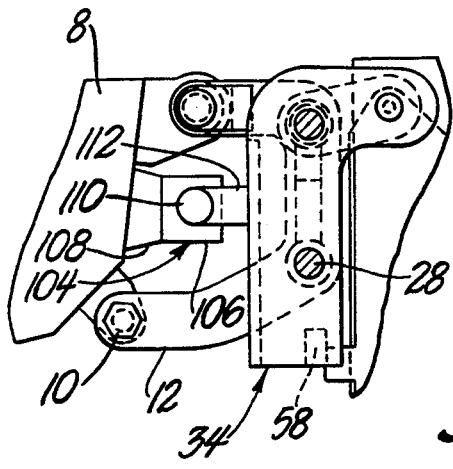
FIG. 13 is a side elevational view showing an optional power unit and neighboring structure.
Figure 14:
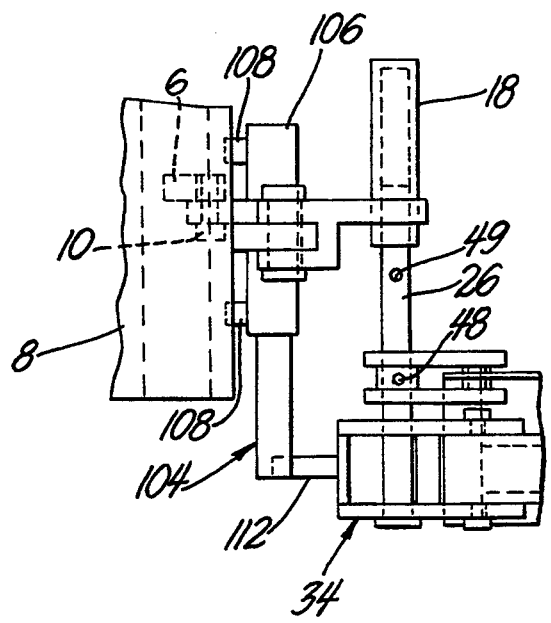
FIG. 14 is a plan elevational view of the power unit and the neighboring structure.

FIGS. 13 and 14 semi-schematically show an optional power mechanism 104 connected between hull 8 and bracket 34 for translating bracket 34 inboard and outboard relative to the hull. Mechanism 104 includes a power unit 106, which can be a conventional power source such as double acting cylinder or a motor, unit 106 being fixed to gussets or ancons 108, which themselves can be bolted or otherwise removably mounted to hull by conventional fasteners. Extending from power unit 106 and translatable thereby is a an elongate member 110, which can be a shaft if power unit 106 is a double acting cylinder or can be a toothed rack if power unit 106 is a motor. Fixed to the end of elongate member 110 is connector plate 112 releasably attached to bracket 34 by bolts (not shown) or other conventional fastening devices. It is preferred that there be very little looseness or play in the translational engagement between power unit 106 and elongate member 110, so that power mechanism 104 stiffens the connection between hull 8 and bracket 34.

OPERATION

Referring to FIGS. 1 and 6, preparation for use of dispenser 40 begins by removing bolt 48 from sleeve 46 so that bracket 36 and shield 38 can be translated along shaft 26 away from bracket 34 and dispenser 40. Shield 38 will be translated far enough inboard from its FIG. 1 position so that the shield's plate 90 is repositioned inboard of dispenser 40 and bracket 34. Bolt 48 will be reinserted in sleeve 46 and will also enter hole 49, whereby bracket 36 and shield 38 are held away from dispenser 40. Dispenser 40 is now in deployed condition. The bottom of dispenser 40 will now be exposed to the ground and lane markers or other objects can be ejected or dropped from the bottom of dispenser 40 during travel of the vehicle of which hull 8 is part. The subassembly formed by bracket 34, bracket 36, dispenser 40 and shield 38 can also be prepared for rapid travel of the vehicle over rough terrain. This is done by translating the subassembly inboard as a unit on shafts 26 and 28 from the FIG. 1 position.

I do not wish to be limited to the exact details of construction or method shown herein since obvious modifications will occur to those skilled in the relevant arts without departing from the spirit and scope of the following claims.

I claim:

1. A combination of mechanical elements by which an accessory is mounted to a vehicle comprising:
    a mounting bracket fixed to the vehicle;
    shafts translatable relative to the vehicle;
    shaft engagement means on the mounting bracket for receiving the shafts;
    an accessory bracket fixed to the shafts;
    a shield bracket engaged to one of the shafts between the mounting bracket and the accessory bracket, the shield bracket movable on the one shaft toward or away from the accessory bracket;
    an accessory pivoted on the accessory bracket;
    a shield pivoted on the shield bracket and translatable along the one shaft therewith;
    a common axis about which the accessory pivots on the accessory bracket and about which the shield pivots on the shield bracket;
    means to lock the shield to the accessory when the shield aligns on the one shaft with the accessory.

2. The mechanism of claim 1 wherein the shield comprises:
    a shield panel connected to the shield bracket and pivotable about the common axis;
    a plate adjoining the shield panel, one side of the plate having an upward facing surface;

wherein the locking means includes a beam extending from the panel, the beam having a beam side engaging the accessory when the shield aligns on the one deployment shaft with the accessory.

3. The mechanism of claim 1 wherein the accessory bracket comprises:
sidewalls;
a web connecting the sidewalls;
ears on the sidewalls intersecting the common axis.

4. The mechanism of claim 3 further comprising:
a shank on the accessory engaging one of the ears, the shank disposed along the common axis;
an abutment bar on the accessory bracket;
an abutment boss on the accessory, the boss faced against the abutment bar and swingable with the accessory.

5. A combination of mechanical elements by which an accessory is connected to a vehicle wherein the accessory can be moved between a deployed position and a retracted position, the mechanism comprising:
a flat, vertically oriented bracket removably fixed to the vehicle;
parallel cylinders affixed to the flat bracket and passing therethrough;
deployment shafts closely and translatably received in the cylinders;
an accessory bracket fixed to the shafts and translatable with the shafts with respect to the cylinders;
a shield bracket engaged to one of the deployment shafts between the flat bracket and the accessory bracket, the shield bracket movable from a first position on the one deployment shaft to a second position on the one deployment shaft, the first position being more remote from the accessory bracket than is the second position;
an accessory pivoted on the accessory bracket;
a shield pivoted on the shield bracket and translatable along the one deployment shaft therewith;
a common axis about which the accessory pivots on the accessory bracket and about which the shield pivots on the shield bracket;
means for locking the shield to the accessory while the secondary accessory bracket is in the second position.

6. The mechanism of claim 5 wherein the shield comprises:
a generally vertical panel connected to the shield bracket and pivotable about the common axis;
a plate adjoining the panel, one side of the plate having an upward facing surface;
wherein the locking means includes an accessory engagement bar extending from the panel on the plate, the bar having bar surfaces opposed to corresponding surfaces of the accessory while the secondary accessory bracket is in the second position.

7. The mechanism of claim 6 wherein the accessory bracket comprises:
upright opposed sidewalls;
a web connecting the sidewalls;
ears integral with the sidewalls intersecting the common axis.

8. The mechanism of claim 7 further comprising:
a shank on the accessory journalled in one of the ears, the shank concentric with the common axis;
an abutment boss on the accessory;
means for limiting swing of the accessory, the limiting means including an abutment bar on the accessory bracket.

9. The mechanism of claim 5 further including a power means for translating the accessory bracket and deployment shafts, the power means comprising:
a power unit;
means to removably fix the power unit to the hull;
an elongate member translatable by the power unit and snugly fit therewith;
means to solidly connect the elongate member to the accessory bracket, whereby the power means stiffens a mechanical connection between the hull and the accessory bracket, wherein the mechanical connection comprises the mounting bracket, the cylinders and the deployment shafts.

10. A combination of elements by which an accessory is deployably comes to a vehicle, comprising:
a shaft translatable relative to the vehicle;
shaft engagement means attached to the vehicle for translatably receiving the shaft;
an accessory bracket fixed to the shaft;
a shield bracket engaged to the shaft, the shield bracket movable from a first position on the shaft to a second position on the shaft, the first position being more remote from the accessory bracket than the second position;
an accessory pivoted on the accessory bracket;
a shield pivoted on the shield bracket and translatable along the one deployment shaft therewith;
a common axis about which the accessory pivots on the accessory bracket and about which the shield pivots on the shield bracket;
means for locking the shield to the accessory while the accessory bracket is in the second position.

11. The mechanism of claim 10 wherein the shield comprises:
a shield member connected to the shield bracket and pivotable about the common axis;
a plate adjoining the shield member, one side of the plate having an upward facing surface;
wherein the locking means includes an accessory engagement bar on the plate, the bar having bar surfaces opposed to corresponding surfaces of the accessory while the secondary accessory bracket is in the second position.

12. The mechanism of claim 10 further including a power means for translating the accessory bracket and the shaft, the power means comprising:
a power unit;
means to fix the power unit to the hull;
an power means member translatable by the power unit and snugly fit therewith;
means to solidly connect the power means member to the accessory bracket, whereby the power means stiffens a mechanical connection between the hull and the accessory bracket.

* * * * *